Patented Nov. 7, 1933

1,933,794

UNITED STATES PATENT OFFICE 1,933,794

CELLULOSE ORGANIC ESTER COMPOSITION OF MATTER CONTAINING A BENZYL ETHER OF A HYDROXYBENZENE

Leon W. Eberlin and John J. Schmitt, Rochester, N. Y., assignors to Eastman Kodak Company, Rochester, N. Y., a corporation of New York No Drawing. Application August 8, 1931
Serial No. 556,034

9 Claims. (Cl. 106—40)

This invention relates to compositions of matter in which an organic ester of cellulose, such, for instance, as cellulose acetate, is combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of our invention is to produce compositions which are capable of easy and convenient manipulation in the plastic and analogous arts, such as in the manufacture of thin sheets, films, artificial silk filaments, varnishes, lacquers and the like, and to produce compositions which will not injure, or be injured by, the substances or surfaces with which they are associated during manufacture. Another object of our invention is to produce compositions which can be molded at elevated temperatures and high pressures to produce plastic products having the desirable properties of celluloid without its undesirable inflammability. Another object of our invention is to produce compositions of matter containing cellulose acetate which have a high degree of flexibility, softness, pliability and clarity. Still another object of our invention is to produce sheets containing cellulose acetate which can be used in the manufacture of laminated glass, known as safety glass. Other objects will become apparent to those skilled in the art to which this invention pertains.

While cellulose acetate has been known for decades, it has also been known that to utilize it in the various plastic arts it is necessary to mix therewith such pasticizing or conditioning agents as triphenylphosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition agents for the same or similar purposes are also added to cellulose acetate to prepare it for use in the other plastic arts, such as in the manufacture of lacquers, varnishes, artificial silk filaments, molded compounds and the like. While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not plasticizers for cellulose acetate, and many substances which act as plasticizers for nitrocellulose are not sufficiently compatible with cellulose acetate to be used as plasticizers in cellulose acetate compositions.

We have discovered that valuable properties may be induced in and/or contributed to compositions containing organic esters of cellulose such as cellulose acetate, by adding thereto as a plasticizing compound a benzyl ether of a polyhydroxy benzene containing a free hydroxyl group, with or without a solvent, such as acetone, which will dissolve both the cellulose derivative and the plasticizer. Examples of these plasticizers are the monobenzyl ether of hydroquinone, the monobenzyl ether of catechol, the monobenzyl ether of resorcinol, the mono- and di-benzyl ethers of pyrogallol, and the mono- and di-benzyl ethers of phloroglucinol. They are compatible with organic esters of cellulose and particularly compatible with cellulose acetate in the percentages hereinafter given. The particularly useful properties which they induce in or contribute to cellulosic compositions containing them are hereinafter enumerated.

The monobenzyl ethers of the dihydroxybenzenes may be prepared as follows. The following ingredients are mixed in a flask provided with a reflux condenser, and into which a stream of nitrogen or other inert gas is continually passed to displace the air and prevent oxidation during the reaction: 750 g. of ethyl alcohol, one gram-molecular weight of the dihydroxy benzene, one gram-molecular weight of benzyl chloride. The mixture is heated until it boils gently. A solution of 40 g. of 98% sodium hydroxide dissolved in 150 g. of water is slowly added through the condenser. The addition of the sodium hydroxide solution should consume 30 minutes, heating being continued during this time and for an additional 15 minutes to complete the reaction. The reaction mixture is then made acid with hydrochloric acid and allowed to cool to room temperature. Most of the sodium chloride and the dibenzyl ether formed crystallize out, the monobenzyl ether remaining in solution. The crystals are filtered off, and washed with a small quantity of alcohol. The monobenzyl ether is then precipitated by pouring the solution into 4 or 5 times its volume of cold water. The precipitate is filtered off, washed with water, and allowed to dry. The product may, if desired, be further purified by recrystallizing from benzene.

The dibenzyl ethers of the trihydroxy benzenes may be prepared by the same method, except that two gram-molecular weights of benzyl chloride are used per gram-molecular weight of trihydroxy benzene. After the reaction mixture has been made acid with hydrochloric acid and allowed to cool to room temperature, the solid is filtered off and the filtrate poured into cold water. The precipitate which forms is collected and recrystallized several times if necessary, first from alcohol and then from benzene.

In order that those skilled in this art may better understand our invention we would state, by way of illustration, that for the manufacture of photographic film or other sheets our new compositions of matter may be compounded as follows: 100 parts of acetone-soluble cellulose acetate, i. e. cellulose acetate containing from 38% to 42% acetyl radical, approximately, is dissolved with stirring at atmospheric temperature in 300 to 500 parts, preferably 400 parts, by weight, of acetone. To this solution may be added from 10 to 50 parts, by weight, of the monobenzyl ether of hydroquinone, 15 parts giving a satisfactory product. Within the limits stated, the amount of plasticizer may be decreased or increased, depending upon whether it is desired to decrease or increase, respectively, the properties which this plasticizer contributes to the finished product. The amount of solvent employed may also be increased or decreased, depending upon whether it is desired to have a more or less freely flowing composition, respectively.

A composition of matter prepared as above described may be deposited upon any suitable film-forming surface to form a film or sheet, in a manner well known to those skilled in the art. A film so produced has permanently brilliant transparency and low inflammability, burning no more readily than ordinary newsprint. Films or sheets produced in accordance with our invention have good flexibility and flexibility retention. For instance, films of cellulose acetate plasticized with 15% (parts by weight based on the acetate) of the monobenzyl ether of hydroquinone, after having been kept at a temperature of 100° C. for 48 hours, showed 1½ more folds than an unplasticized film similarly treated, when tested on the modified Schopper fold-tester commonly used in making such tests.

Other similar solvents (instead of acetone) which are compatible with the cellulose acetate and our new plasticizers may also occur to those skilled in this art. In like manner, these plasticizers may be compounded with other single esters of cellulose, such as cellulose propionate, butyrate, and the like, or with mixed organic and/or inorganic esters, such as cellulose aceto-stearate, cellulose aceto-propionate, cellulose aceto-malate, or cellulose nitro-acetate, a suitable solvent which will dissolve both the cellulose derivative and the plasticizer being employed.

Inasmuch as our above-described compositions of matter are quite useful in the preparation of films and sheets, it will be apparent that our new plasticizers may also be employed with advantage in the other branches of the plastic art. For instance, our above-described compositions of matter may be employed in the manufacture of artificial silk by the dry spinning method. With the proper coagulating bath they may also be employed for wet spinning. It may be desired to employ compositions of different viscosity or evaporation characteristics, but this is a mere matter of changing the solvent proportion or adding evaporation retardents or other high or intermediate boiling constituents, as has been well known in the art for more than a decade. Our novel plasticizers may also be employed with advantage in connection with a number of the known lacquer and varnish formulæ with which they may be found to be compatible. In such cases the plasticizer is usually first put into solution with the cellulose derivative solution and if non-solvents are added for the purpose of cheapening the composition they are added only to such an extent as will not precipitate the derivative from solution. Also the plasticizer is usually employed in larger amounts, such as from 50 to 60 parts, in compounding lacquers. Other uses within the scope of my invention will also suggest themselves to those skilled in the art, and are to be included within the scope of the claims appended hereto.

The benzyl ethers of polyhydroxybenzenes containing a free hydroxyl group may also be advantageously used as plasticizers in cellulose acetate molding compositions. For instance, when from 10% to 50% (parts by weight based on the cellulose acetate) of the mono-benzyl ether of hydroquinone is homogeneously mixed with cellulose acetate, this mixture may be converted into a hard, translucent plastic product by molding at a temperature of 120° C. and a pressure of 1000 pounds per square inch, in a manner already known to those skilled in molding compounds of that nature. One of the advantages of molded products prepared with such plasticizers as ours, which, when heated, are solvents for cellulose acetate, is that when the molding composition is prepared without the use of a volatile solvent, warping of the finished product upon aging does not occur. Our novel plasticizers may be mixed with the cellulose acetate and these plasticizers may be prepared in accordance with the method disclosed in the application of Dennis E. Northrup and Amos W. Crane, Serial #551,508. This method comprises dissolving the cellulose acetate in acetone, adding a plasticizer to the solution, and thereafter precipitating the cellulose acetate by adding toluene to said solution in an amount representing approximately a ratio of 3:1 with respect to the acetate, and finally removing the acetone-toluene mixture. We may also prepare molding powders from cellulose acetate and our new plasticizers by dissolving the cellulose acetate in acetone, adding the plasticizer to the solution, and precipitating by pouring the solution into water, with stirring.

We may also prepare hard, translucent plastic products from cellulose acetate and our new plasticizers by heating a mixture of 100 parts of cellulose acetate with about 45 parts, for instance, of the monobenzyl ether of hydroquinone in an open vessel at 130° C. A clear, viscous solution is formed, which on cooling to 50° C. forms a hard, transparent cake.

Moreover, we have found that, upon the addition to cellulose acetate of approximately 100% of a benzyl ether of a polyhydroxybenzene containing a free hydroxyl group, quite unexpected compatibility of the plasticizer with the cellulose acetate exists and also that quite unexpected flexibility, plasticity and clarity of the final product results. Contrary to experience in most cases where such a large proportion of plasticizer is used, no exudation or crystallizing out of the plasticizer occurs. Such compositions have great utility where a highly flexible compound is desired, such as in the coating of a base (for instance, cloth or other fabric) in the production of artificial leather or the production of relatively thin sheets wherein more than the usual flexibility is important. Such a composition, if converted, for instance, into sheet form will be found to be supple and non-rigid, and to have the ability to conform readily to a surface upon which it may be placed, and this even at atmospheric temperatures.

These novel compositions of matter are produced by merely mixing the plasticizer with cellulose acetate and then adding sufficient of a common solvent, such as acetone, whereupon an intimate mixture of the plasticizer with the cellulose acetate results. The amount of acetone or other common solvent to be employed varies, of course, within rather wide limits depending upon the fluidity of the composition desired. 100 parts of acetone will suffice for many purposes, although we prefer to use 400 parts. Various high boilers or evaporation retardents, such as ethyl lactate, amyl acetate or the like may also be added if desired, as is well known in this art.

The composition of matter so produced may then be coated into sheets in the usual way by depositing it upon plates or rolls and permitting the solvent to evaporate. If one of our novel compositions is to be employed in the manufacture of artificial leather, it may be coated upon, for instance, a cloth support and the solvent permitted to evaporate, or the cloth support may be caused to pass through the cellulose acetate-plasticizer composition and permitted to absorb the solution, the solvent in the coating being then permitted to evaporate. In either case, the solvent may, of course, be recovered if desired by condensing the vapors etc.

While above and in certain of the claims appended hereto, I have referred to the use of a plasticizer in approximately equal proportions, namely in a ratio of approximately 100%, it will be understood that within this terminology variations of from 10% to 15% less than 100% of plasticizer and as much as 25% to 50% more than 100% of the plasticizer may in some instances be desirable.

We have further discovered that a sheet spread or cast from a solution of cellulose acetate and any of our novel plasticizers in a volatile solvent, such as acetone, adheres well directly to glass when subjected to heat and pressure, and is thus very useful in the production of laminated or "safety" glass without the use of intermediate layers of adhesive. A sheet comprising cellulose acetate and any of our novel plasticizers may be placed between two sheets of glass and the whole put into a press and subjected, for instance, to a temperature of 140° C. and a pressure of 1500 pounds per square inch, in a manner already known in the manufacture of laminated glass.

What we claim as our invention, and desire to be secured by Letters Patent of the United States is:

1. A composition of matter comprising an organic ester of cellulose and a benzyl ether of a trihydroxy benzene containing a free hydroxyl group.

2. A composition of matter comprising cellulose acetate and a benzyl ether of a trihydroxy benzene containing a free hydroxyl group.

3. A composition of matter comprising cellulose acetate and a monobenzyl ether of a trihydroxy benzene.

4. A composition of matter comprising cellulose acetate and a dibenzyl ether of a trihydroxy benzene.

5. A composition of matter comprising 100 parts of cellulose acetate and approximately 10 to 100 parts, by weight, of a benzyl ether of a trihydroxy benzene containing a free hydroxyl group.

6. A relatively thin sheet comprising 100 parts of cellulose acetate and approximately 10 to 100 parts, by weight, of a benzyl ether of a trihydroxy benzene containing a free hydroxyl group.

7. A molding composition adapted to molding under elevated temperatures and high pressures, comprising cellulose acetate and a benzyl ether of a trihydroxy benzene containing a free hydroxyl group.

8. A molding composition adapted to molding under elevated temperatures and high pressures, comprising 100 parts of cellulose acetate and approximately 10 to 50 parts, by weight, of a benzyl ether of a trihydroxy benzene containing a free hydroxyl group.

9. A molding powder prepared by precipitation, comprising cellulose acetate and a benzyl ether of a trihydroxy benzene containing a free hydroxyl group.

LEON W. EBERLIN.
JOHN J. SCHMITT.